United States Patent Office 3,436,180
Patented Apr. 1, 1969

3,436,180
PROCESS FOR MAKING TITANIUM DIOXIDE USING CARBON MONOXIDE CONTAINING INORGANIC ASHES
Robert Jean Mas and André Louis Michaud, Thann, France; said André L. Michaud, assignor to Fabriques de Produits Chimiques de Thann et Boîte Postale, Thann, France
Filed Aug. 1, 1966, Ser. No. 569,153
Claims priority, application France, Aug. 4, 1965, 27,182
Int. Cl. C01g 23/04
U.S. Cl. 23—202    2 Claims

ABSTRACT OF THE DISCLOSURE

A process for producing pigmentary titanium dioxide by reacting titanium tetrachloride, oxygen or an oxygen containing gas, independently producing a gas mixture containing carbon monoxide by the incomplete combustion of a combustible mixture of 10 to 100% by weight of charcoal so as to produce carbon monoxide containing from 50 to 200 milligrams per cubic meter thereof of basic inorganic ash; mixing the carbon monoxide with the reactants; reacting the reactants in the vapor phase at a temperature of 1000° C. to 1400° C. to provide an additional source of heat for reaction and recovering the titanium dioxide so formed.

---

Figure 1:

The invention claimed relates to a process for making titanium dioxide wherein there is used carbon monoxide containing inorganic ashes.

It is already known that it is possible to make titanium dioxide by reacting at high temperatures the vapors of titanium tetrachloride and oxygen. It is thus possible to obtain titanium dioxide in the form of a finely divided powder which can be used for many purposes such as paint pigments, for plastic materials, for printing inks and in the paper industry. At the temperatures where the same takes place, the reaction needs externally supported calories to proceed. This is effected either by preheating all or a part of the reactive gases or by an auxiliary heat source such as for example the hot gases issued from combustion of carbon monoxide in oxygen, which are mixed with the reactants.

Regardless of the uses to which the titanium dioxide is put, it is always advantageous that the same be obtained in the form of a powder all the particles of which disperse and distribute themselves uniformly in the media in which they must be incorporated so that the efficacy of the material be maximum.

It should be noted that regardless of the particular process for making titanium dioxide which is used, the product obtained does not always have this characteristic of separate particle formation.

If, for example, there is examined a sample of titanium dioxide, with an electronic microscope capable of enlarging fifty thousand times, there can be seen that very often the particles of titanium dioxide have poorly defined shapes, are glued to one another in the form of blocks or in the form of chains more or less branched and experience has shown that these agglomerates, regardless of their shape, remain in any event of a size sufficiently small so that it is impossible to separate them into individual grains by previously known physical manipulations. Furthermore they are too small and too solid to be broken and disintegrated by crushing and disintegrating operations.

The result of this is that the pigmentary efficiency of the titanium dioxide on the basis of the weight of oxide used is less than would be expected. In the case of pigmentary titanium dioxide for use in paints, there are noted insufficient brightness, abnormal oil absorption and unsatisfactory dispersibility.

The reasons for the formation of agglomerates and for a sintering of the grains are in reality quite unknown.

The present invention has for its object a process for making titanium dioxide which avoids the disadvantages previously mentioned and results in the obtaining of a well crystalised dioxide the grains of which are quite well separated and guarantee a maximum efficiency in the use of the oxide.

The process according to the invention consists in causing the reaction at high temperature of oxygen or an oxygen containing gas with vapors of a halogen of titanium and in using as a source of auxiliary heat the combustion of carbon monoxide in oxygen, the process being characterised in that the carbon monoxide used emanates from a gas producer fed partially or totally with charcoal.

More specifically the present invention resides in a process for producing pigmentary titanium dioxide exhibiting improved non-agglomerated granulometry which comprises reacting in a vapor phase at a reaction temperature of 1,000 to 1,400° C., titanium tetrachloride and oxygen or an oxygen-containing gas; independently producing carbon monoxide by the incomplete combustion of a combustible mixture containing from 10 to 100% by weight of charcoal by means of which is obtained a carbon monoxide containing from 50 to 200 milligrams per cubic meter thereof of basic inorganic ashes; mixing the said carbon monoxide with said reactants, burning said carbon monoxide in said oxygen to provide an additional source of heat for said reaction and recovering the titanium dioxide so formed.

Figure 2:
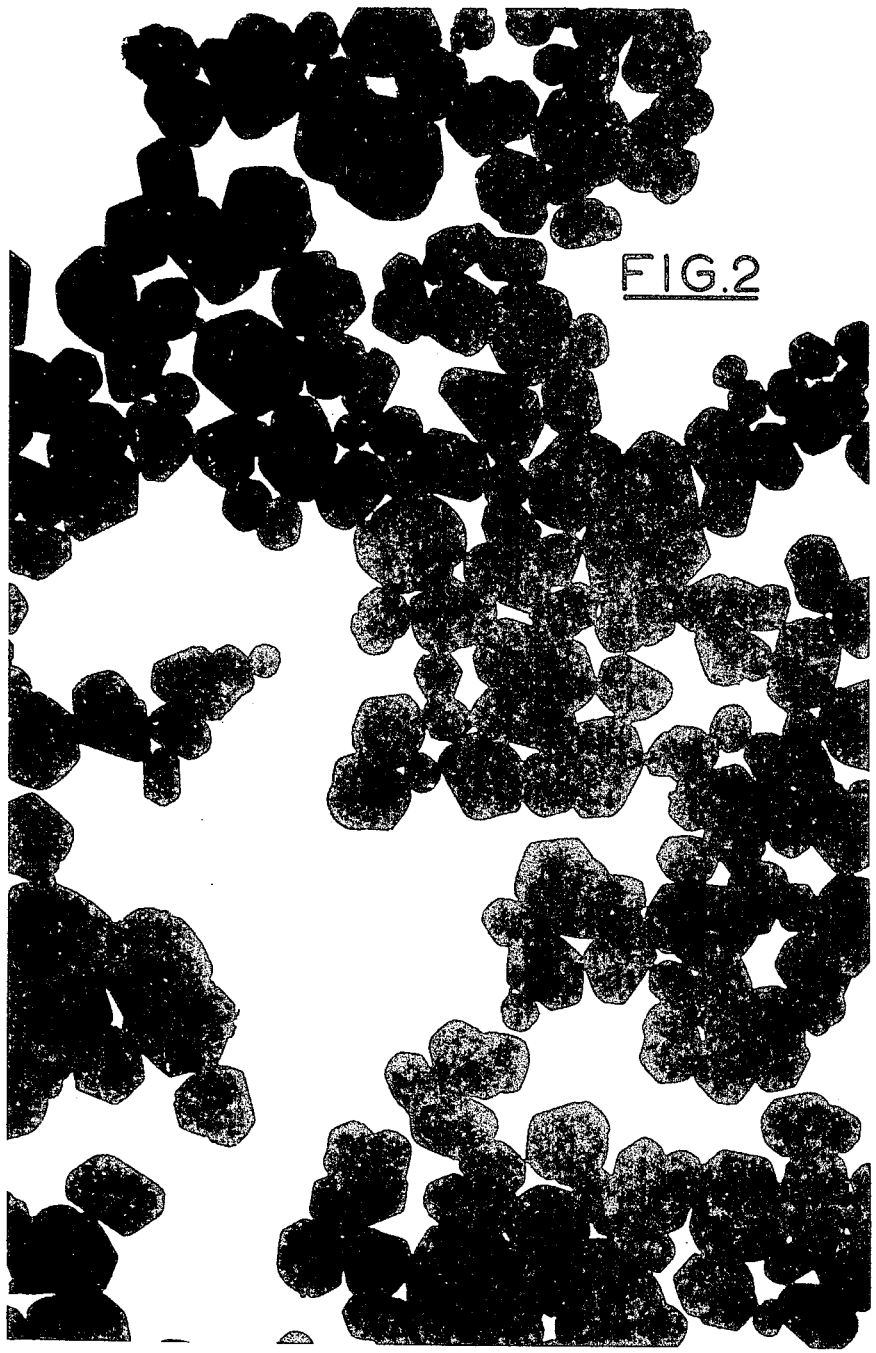

In the drawing, FIGURE 1 is a photomicrograph taken with an electronic microscope at an enlargement of 50,000 showing greatly magnified the particles of titanium dioxide obtained with the use of carbon monoxide emanating from a gas producer not using charcoal, while FIGURE 2 is the same for particles of titanium dioxide obtained with carbon monoxide made in a gas producer using charcoal.

Unexpectedly it has been found that the use of the carbon monoxide containing the indicated amount of inorganic ashes leads to the obtention of a titanium dioxide the particles of which do not stick together. Furthermore, with the present process it is not necessary to use any water for the nucleation of the titanium dioxide. This results in the fact that no hydrochloric acid is formed and causes an advantageous chlorine savings due to the avoidance of chlorine loss in the form of hydrochloric acid.

It should be noted that in order to obtain the advantageous results of the invention, it is not necessary to use carbon monoxide produced in a gas producer which uses only charcoal. It suffices for the purposes of the invention that a sufficient quantity of charcoal be mixed to other combustibles such as petroleum coke, domestic coke or graphite. For that reason the amount of charcoal used herein can range from 10 to 100% of the total combustibles. These combustibles in conventional manner are then incompletely burnt to produce carbon monoxide.

In order to carry out the invention it is possible to regularly introduce a little charcoal in a gas producer functioning with another combustible or to use two or more separate gas producers, some operating with charcoal, the other operating with other combustibles, the gases thus obtained being mixed in variable proportions.

The following example is given to illustrate but not limit the invention.

Example

There is produced 3,500 moles per hour of titanium dioxide by the combustion of the same quantity of titanium tetrachloride in presence of an excess of oxygen with the flame produced by the combustion of 4,000 moles of carbon monoxide and 2,200 moles of oxygen.

The carbon monoxide is obtained in the form of a mixture containing 75% by volume of carbon monoxide, 10% by volume of carbon dioxide, nitrogen and small quantities of hydrogen by means of a gas producer fed with graphite and a mixture of oxygen and nitrogen. The gases coming out of the generator are washed with water according to conventional techniques and dried over sulphuric acid.

There is recovered at the outlet of the oxidizer titanium dioxide which has an excellent white color and the air absorption of which is 29%, the brightening power 1750 and the apparent density (non-sedimented) 0.2. Under the same conditions of concentration and gas flow but using in the gas producer not just graphite but a mixture containing 90% by weight of graphite and 10% by weight of charcoal there is obtained a titanium dioxide of the same color the oil absorption of which is 18%, the brightening power 1900 and the apparent density (non-sedimented) 0.5.

As determined by gas chromatography, the volume composition of carbon monoxide mixtures suitable for the practise of the invention, are the following: carbon monoxide 60–85%, nitrogen 5–30%, carbon dioxide 5–15%, hydrogen 0.8–1.5% and 50 to 200 milligrams per cubic meter of said mixture of inorganic ashes resulting from combustion of the charcoal.

Returning to the photomicrograph of the drawings, it is evident that in the case of FIGURE 1, in the titanium dioxide produced with conventional carbon monoxide and not containing the inorganic ashes according to the present invention, the grains thereof are rounded and many of them stick to one another and thereby form small chains which can contain up to 15 or 20 grains. By contrast the product obtained according to the present invention, and shown on FIGURE 2, has perfectly individual grains having well defined surfaces.

The titanium dioxide obtained according to the invention in the form of a well divided powder can be used with great advantages for all the conventional uses of titanium dioxide.

The exact process whereby the beneficial effects of the invention are obtained are not known. However, it is believed that the presence of the inorganic ashes exerts a decatalysing effect on the formation of the titanium dioxide and further homogenizes the combustion flame.

What is claimed is:

1. A process for producing pigmentary titanium dioxide, which comprises bringing together titanium tetrachloride and a gas selected from the group consisting of oxygen and oxygen-containing gas; independently producing a gas mixture containing carbon monoxide by the incomplete combustion of a combustible mixture comprising 10 to 100% by weight of charcoal so as to produce carbon monoxide containing from 50 to 200 milligrams per cubic meter thereof of basic inorganic ashes; mixing the said gas mixture with said reactants; reacting said reactants in the vapor phase at a temperature of 1000° C. to 1,400° C., while burning said carbon monoxide in said oxygen or oxygen containing gas to provide an additional source of heat for said reaction and recovering the titanium dioxide so formed.

2. Process according to claim 1, wherein said gas mixture contains in volume from 60 to 85% of carbon monoxide, from 5 to 30% of nitrogen, from 5 to 15% of carbon dioxide, from 0.8 to 1.5% of hydrogen and from 50 to 200 milligrams per cubic meter of said mixture of inorganic ashes.

References Cited

UNITED STATES PATENTS

| | | | |
|---|---|---|---|
| 2,737,448 | 3/1956 | Cunningham et al. | 23—204 |
| 2,830,883 | 4/1958 | Eastman | 23—204 |
| 3,062,621 | 11/1962 | Nelson et al. | 23—202 |
| 3,069,282 | 12/1962 | Allen | 23—202 XR |
| 3,120,427 | 2/1964 | Mas et al. | 23—202 |

FOREIGN PATENTS

| | | |
|---|---|---|
| 326,227 | 3/1930 | Great Britain, |

OTHER REFERENCES

Bureau of Mines, R.I. 4465 (June 1949), p. 8.

EDWARD STERN, *Primary Examiner.*

U.S. Cl. X.R.

106—300